United States Patent [19]
Hihara et al.

[11] Patent Number: 6,110,351
[45] Date of Patent: Aug. 29, 2000

[54] METHOD OF ELECTROCHEMICAL MACHINING (ECM) OF PARTICULATE METAL-MATRIX COMPOSITES (MMCS)

[75] Inventors: Lloyd Hiromi Hihara, Mililani; Philip Panquites, IV, Pearl City, both of Hi.

[73] Assignee: University of Hawaii, Honolulu, Hi.

[21] Appl. No.: 09/173,700

[22] Filed: Oct. 15, 1998

[51] Int. Cl.$^7$ ................................ B23H 3/00; B23H 9/00
[52] U.S. Cl. .................... 205/672; 205/674; 205/685
[58] Field of Search ................................. 205/672, 674, 205/685, 665

[56] References Cited

U.S. PATENT DOCUMENTS

| | | | |
|---|---|---|---|
| 3,718,555 | 2/1973 | Darling et al. | 204/129.75 |
| 4,193,853 | 3/1980 | Childs et al. | 204/129.95 |
| 4,504,370 | 3/1985 | Lindner et al. | 204/129.1 |
| 4,522,692 | 6/1985 | Joslin | 205/653 |
| 4,731,116 | 3/1988 | Kny | 75/238 |
| 4,997,534 | 3/1991 | Thornton | 204/129.1 |
| 5,171,408 | 12/1992 | Thornton | 204/129.1 |

OTHER PUBLICATIONS

Davydov, "Electrochemical Machining Of Composite Materials By Anodic Dissolution," Elektronnaya Obrabotka Materialov, No. 6, 1989, pp. 11–14. No month available.
Smith, "Integrated Manufacturing Of Aluminum MMC Components", Forging Technology, Feb. 1996, p. 12.
Coughanowr, "electrochemical Machining Of Cemented Titanium Carbide," Abstract of Masters Thesis, 1982, p. 1. No month available.

*Primary Examiner*—Donald R. Valentine
*Attorney, Agent, or Firm*—Flehr Hohbach Test Albritton & Herbert LLP

[57] ABSTRACT

A method of machining metal-matrix composite materials using electrochemical machining is provided. The method comprises the steps of: providing a metal matrix composite material in an electrochemical machine, and electrochemically machining the metal-matrix composite material in a nitrate or chloride containing electrolyte at a current density of equal to or greater than approximately 1 A/cm$^2$. Preferably the metal-matrix composite is comprised of an aluminum alloy or pure Al matrix with ceramic particles, such as silicon carbide.

12 Claims, 2 Drawing Sheets

METHOD OF ELECTROCHEMICAL MACHINING (ECM) OF PARTICULATE METAL-MATRIX COMPOSITES (MMCS)

FIELD OF THE INVENTION

This invention relates generally to a method of electrochemical machining (ECM) of particulate metal-matrix composites (MMCs), and more particularly to a method of electrochemical machining of particulate aluminum metal-matrix composites.

BACKGROUND OF THE INVENTION

Metal-matrix composite (MMC) materials are useful in a variety of industries. Generally, MMCs are comprised of a variety of ceramic materials contained in a metal matrix. The ceramic materials are usually in the form of particles or continuous fibers. Particulate MMCs are reinforced with ceramic particles. One such MMC of interest is silicon carbide/aluminum (SiC/Al) MMC. SiC/Al MMCs are candidate packaging materials for electronic components. Low density and a coefficient of thermal expansion relatively close to that of gallium arsenide make SiC/Al MMCs attractive for electronic component packaging. Moreover, silicon carbide/aluminum is a favored particulate metal-matrix composite where superior attributes such as hardness and stiffness, strength at elevated temperatures, high thermal conductivity, low coefficient of thermal expansion and resistance to wear and abrasion are of primary value.

Unfortunately, the properties that make MMCs attractive also render them difficult to fabricate, and very difficult if not impossible to machine by conventional cutting methods (i.e., diamond edge tools) since the particles dull and abrade cutting tools. For example, when forming an electronic package, typically a network of channels and cavities are machined into the packing material in which the electronic components are to be mounted. SiC/Al MMCs are difficult to machine using conventional cutting methods since the hard SiC reinforcement particles abrade and dull the cutting tools. MMCs having high silicon carbide content cannot be effectively machined using conventional physical machining techniques.

Currently, particulate MMCs, including SiC/Al MMCs in particular, have been machined by conventional cutting methods with limited success. Excessive tool wear and subsurface damage to the work piece have prevented the cutting method from being widely accepted. In the case of MMCs with high SiC particle volume fraction, components cannot be machined and must be cast to near net shapes. Casting can be very expensive for small lot sizes and can limit the variety of parts to be fabricated. Additionally, powder metallurgy and hot-pressing techniques have been employed to produce MMCs; however, only relatively simple shapes can be formed by these methods. This difficultly in fabrication has severely limited the use of MMCs. Thus, the development of alternative machining methods for MMCs is desired and would be a significant advance in the art.

OBJECTS AND SUMMARY OF THE INVENTION

Accordingly, it is an object of this invention to provide a method to fabricate MMC components or materials.

More particularly, it is an object of the present invention to provide a method to fabricate MMC components using electrochemical machining methods.

A further object of the present invention is to provide a method of fabricating aluminum MMC components containing ceramic particles such as SiC.

A related object of the present invention is to provide a method of electrochemical machining of MMC components.

Another object of the present invention is to provide a method of fabricating MMC components that is economical and allows the fabrication of complex shapes.

These and other objectives are achieved by the method herein of machining MMC materials comprising the steps of: providing the MMC material in an electrochemical machine; and electrochemically machining the MMC material in a nitrate or chloride containing electrolyte at a current density of equal to or greater than approximately 1 $A/cm^2$; and flushing the electrolyte between the electrochemical tool and the metal matrix composite material.

BRIEF DESCRIPTION OF THE DRAWINGS

Other objects and advantages of the invention will become apparent upon reading of the detailed description of the invention provided below and upon reference to the drawings in which.

DETAILED DESCRIPTION OF THE INVENTION

In summary, the inventors have discovered that MMC materials can be machined using electrochemical machining (ECM). This is a significant advance over the conventional methods of fabricating MMCs which involves physical machining with cutting tools. When using an electrochemical machining method, there is no tool wear and subsurface damage of the MMC when operated under correct conditions.

According to the method of the present invention, a method of machining an MMC material is provided. Specifically, the method comprises the steps of providing the MMC material in the electrochemical machine; and electrochemically machining the MMC material in a nitrate or chloride containing electrolyte at a current density equal to or greater than approximately 1 $A/cm^2$. The inventors have found that the metal-matrix is electrochemically dissolved and unbinds the ceramic particles in the composite which are then flushed away by the flowing electrolyte.

Figure 1:
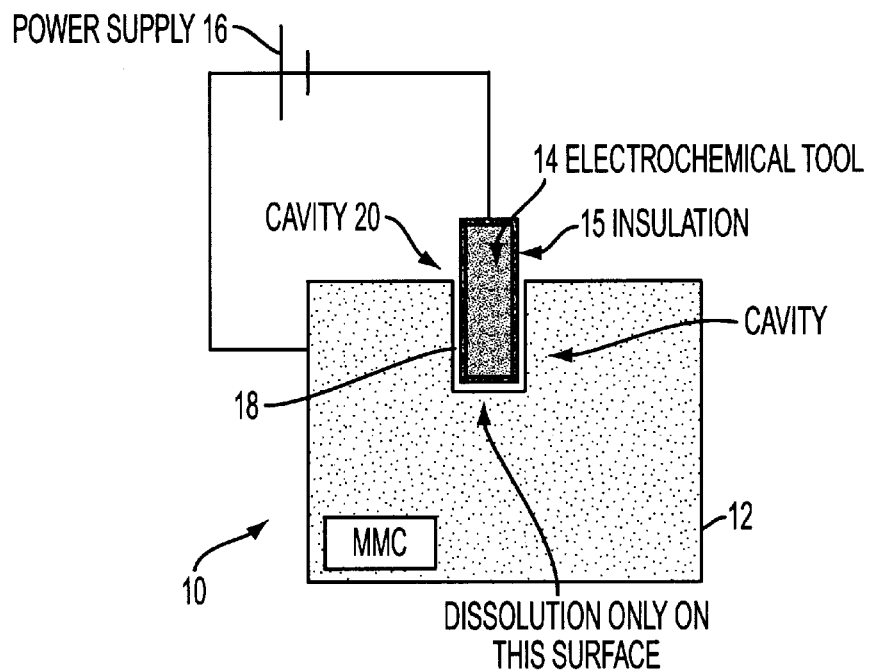
FIG. 1 is a schematic diagram of an electrochemical machining tool capable of carrying out the method of the present invention.

Turning to FIG. 1, a simplified schematic drawing of an electrochemical machine is shown which may be used to carry out the method of the present invention. The electrochemical machine is an electrochemical cell. Electrochemical machining is an electrolytic technique where a work piece is the anode and a machining tool is the cathode. Material is removed from the work piece by anodic dissolution. Specifically, the electrochemical machine 10 includes an article or material 12 to be machined and an electrochemical machining tool 14. According to the present invention the material 12 is comprised of a MMC material. The MMC material 12 is the anode of the electrochemical cell. The MMC material 12 is machined by the electrochemical tool 14 which is a metal piece formed in a shape that conforms to the shape to be machined. The tool 14 is the cathode of the electrochemical cell. A power supply 16 provides controlled voltage or current to the electrochemical cell and is connected to the MMC material 12 and the tool 14 such that the MMC material 12 is the anode. Preferably, the tool 14 includes a layer of insulation coating 15 disposed on the outer surface of the tool 14. The insulation prevents unwanted machining in regions of the workpiece adjacent to the insulated layer.

To remove material from the MMC material 12, an electrolyte is employed. In general, the electrolyte is an aqueous solution containing ions that carry the ionic current between the anode and the cathode. When the current is passed though the cell, metal material is dissolved from the anode (i.e. the MMC material 12) by anodic dissolution in a pattern that generally conforms to the shape of the cathode (i.e. the tool 14). The electrolyte 18 is disposed between the tool 14 and the MMC material 12. The electrolyte may be supplied via a bore in the tool 14 (not shown) or by an external conduit. Electrolytes finding use in the present invention are nitrate electrolytes such as sodium nitrate ($NaNO_3$). Other electrolytes such as potassium nitrate, potassium chloride and sodium chloride could be used. Sodium nitrate is the preferred electrolyte and is provided in an aqueous solution having a concentration in excess of 0.1M, with a 2M $NaNO_3$ electrolyte giving good results.

To machine the MMC material 12, the tool 14 is placed close to the surface of the MMC 12 and current is applied to the cell via power supply 16. Anodic dissolution begins to occur, and cavity 20 begins to form in the MMC material 12. Tolerances of approximately 0.05 mm can be achieved by maintaining small distances of approximately 0.025 to 0.75 mm between the material 12 and the tool 14. The cavity 20 generally conforms to shape of the cathode (i.e. tool 14). Electrochemical machining continues until the desired shape of the MMC material is formed. According to the present invention a current density of equal to or greater than approximately 1 $A/cm^2$ is applied. The current density will vary depending on the electrochemical machine used. In an exemplary embodiment, a current density in the range of 1 to 10 $A/cm^2$ is used, with a current density of 2.5 $A/cm^2$ being preferred.

Of particular advantage, the method of the present invention provides for the machining of MMC materials. As discussed above, the hardness of MMCs makes them difficult to machine by conventional methods. The present invention overcomes such limitations. Specifically, the method of present invention provides for machining of aluminum MMCs, and in particular, silicon carbide/aluminum (SiC/Al) MMCs. MMCs are successfully machined by the inventive method, including MMCs having high silicon carbide content (i.e. ≈40% or higher). In particular, MMCs having discrete silicon carbide particles of various concentrations may be machined. The MMC may be comprised of a variety of metals and ceramics. Preferably, the MMC is comprised of aluminum and silicon carbide. The aluminum metal of the MMC may comprise an alloy such as 6061 Al or may be comprised of pure aluminum and silicon carbide. In addition, the method of the present invention may use other particulate aluminum metal-matrix composites that are reinforced with different particles such as silicon nitride, titanium diborides, diamond, and the like. The ceramic particles are generally inert and do not take part in the electrochemical reaction.

An important parameter in carrying out the method of the present invention is the current density at which the electrochemical machine is operated. It was believed that the presence of the silicon carbide particles in the metal matrix may significantly effect this parameter. To investigate its effects, potentiodynamic polarization experiments were conducted to determine the breakdown potential of the MMCs, in particular SiC/6061 Al composites. MMC materials having 25 and 40 vol. % of SiC, the balance 6061 Al, were prepared to determine the effects of SiC content and the alloying elements in 6061 Al on dissolution characteristics. These MMCs were then compared to monolithic 6061 Al, and ultrapure Al (99.999%) materials. The mean diameter of the SiC particles was 3.5 microns. Planar electrodes were used for the potentiodynamic polarization experiments. The electrodes were polished to a 0.05 micron finish and rinsed in 18 MΩ-cm water prior to polarization experiments. A 2 M $NaNO_3$ solution was used as the electrolyte. The electrolyte was prepared by mixing reagent grade $NaNO_3$ and 18 MΩ-cm water. The electrolyte temperature was maintained at 30° C. Potentiodynamic experiments were conducted in solutions deaerated with pre-purified (99.99%) nitrogen gas. An EG&G Princeton Applied Research (PAR) Model 273 Potentiostat was used to perform the potentiodynamic experiments. Electrode potentials were measured with respect to a saturated calomel electrode (SCE).

Figure 2:
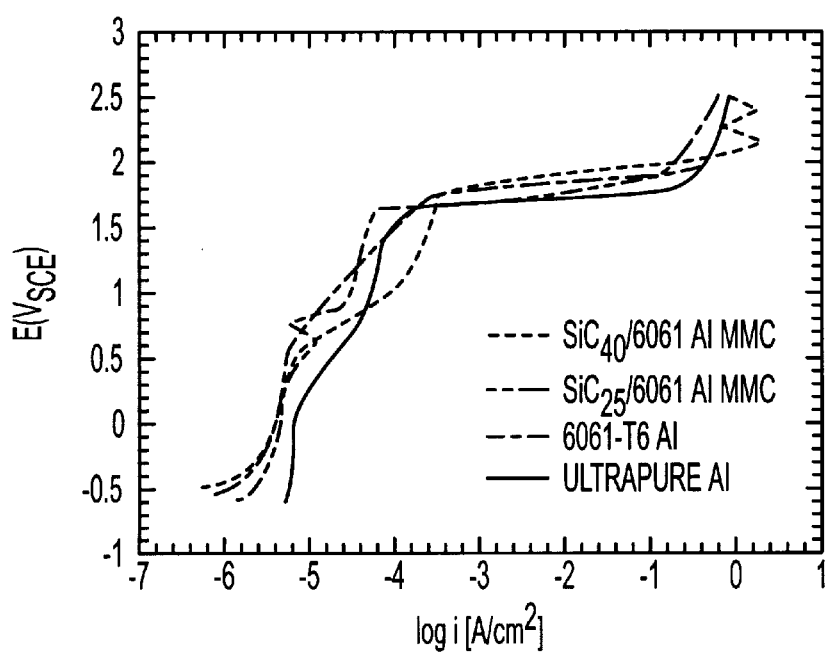
FIG. 2 is an anodic polarization diagram for different MMCs, ultrapure aluminum, and an aluminum alloy fabricated according to one embodiment of the method of the present invention.

The results of the potentiodynamic polarization experiments are illustrated in FIG. 2. FIG. 2 shows a plot of anodic polarization diagrams for the various materials. A comparison of the anodic polarization curves shows that all of the materials breakdown at approximately 1.75 $V_{SCE}$. Hence, neither the alloying elements in the 6061 Al material, nor the SiC particles had significant effect on the breakdown potential as compared to ultrapure Al. Consequently, the SiC/6061 Al metal-matrix composites must be machined at potentials exceeding approximately 1.75 $V_{SCE}$ in a 2M $NaNO_3$ electrolyte. For electrolytes of lower $NaNO_3$ concentration, the potential should increase. For chloride electrolytes, the potential should be significantly lower (e.g., ≈−0.7 $V_{SCE}$).

Of particular advantage, the method of the present invention provides for the fabrication of MMCs having desirable surface finishes. Galvanostatic experiments in concert with rotating cylindrical electrodes were conducted to determine the effect of the electrolyte convention rate and dissolution current densities on the surface finish of the machined MMC. The experiments use a rotating electrode as an experimental technique to force convection at the electrode; however, during the actual machining process, electrolyte convection should be induced by other methods (such as pressure gradients and the like). Again, MMC materials having 25 and 40 vol. % of SiC, the balance 6061 Al, were prepared and compared to monolithic 6061 Al, and ultrapure Al (99.999%) materials. The materials were fabricated as instrument grade MMCs by Advanced Composite Materials Corporation (Greer, S.C.). The mean diameter of the SiC particles was 3.5 microns. A 2 M $NaNO_3$ solution was used as the electrolyte. The electrolyte was prepared by mixing reagent grade $NaNO_3$ and 18 MΩ-cm water. The electrolyte temperature was maintained at 30° C. An electrolyte of 2M $NaNO_3$ produces a better surface finish than NaCi electrolytes for monolithic Al alloys. The galvanostatic rotating-electrode experiments were conducted in solutions exposed to air.

Cylindrical electrodes were used for the galvanostatic rotating-electrode experiments. The cylindrical electrodes had a thickness of 1 mm, and an outer diameter of 11.8 mm. The electrodes were polished to a 0.05 micron finish and rinsed in 18 MΩ-cm water prior to polarization experiments. An EG&G Princeton Applied Research (PAR) Model 273 Potentiostat was used to perform the galvanostatic experiments for current densities up to 1 A/cm$^2$. Electrode potentials were measured with respect to a saturated calomel electrode (SCE). For galvanostatic experiments exceeding 1 A/cm$^2$, a Sorensen Nobartron DCR 80–10 power supply was used. The electrodes were rotated using an EG&G PAR Rotating Electrode setup.

The galvanostatic experiments on rotating cylindrical SiC (40 vol. %)/6061Al (SiC$_{40}$/6061 Al) MMC electrodes were conducted at a current density of 1 A/cm$^2$ and rotational speeds between 0 and 5000 RPM. At low convection rates (corresponding to a rotation speed with approximately 100 RPM), hydrogen bubbles adhered to the MMC material and impeded dissolution, producing a nodular surface finish which was visible to the naked eye. Rotational speeds exceeding 1000 RPM were required to sweep away hydrogen bubbles. To produce desirable surface finishes, the electrolyte convection rates must be sufficient to flush away hydrogen bubbles that adhere to the surface of the SiC/6061 Al MMC electrodes. The electrolyte convection rates will vary with the electrochemical machine, but what is important is to achieve a rate that flushes away the hydrogen bubbles. The bubbles impede dissolution and caused a nodular surface finish to develop. At electrode rotational speeds exceeding 1000 RPM, the nodular surface was eliminated. Thus, rotational speeds greater than 1000 RPM produced the best results during the experimental tests.

Figure 3:
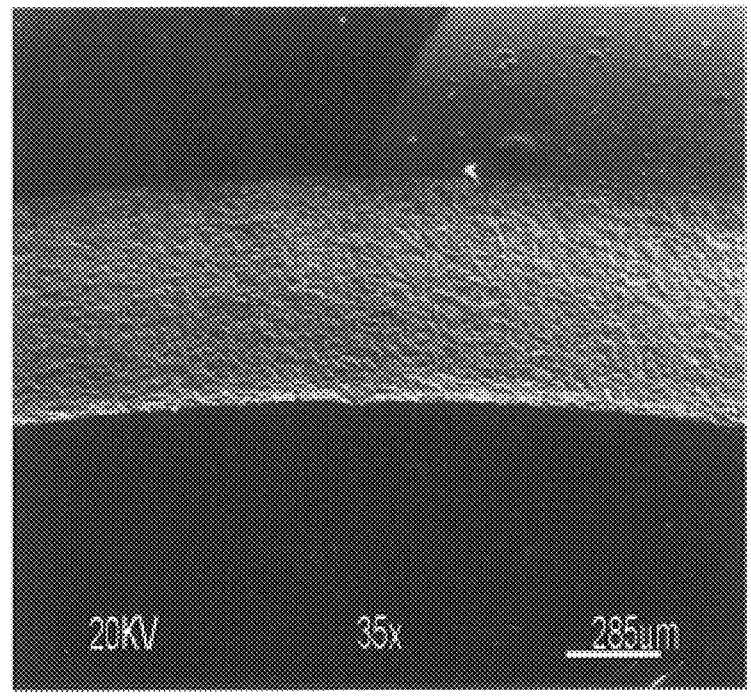
FIG. 3 is a Scanning Electron Microscope (SEM) micrograph showing the surface finish of an MMC fabricated in accordance with one embodiment of the present invention.
Figure 4:
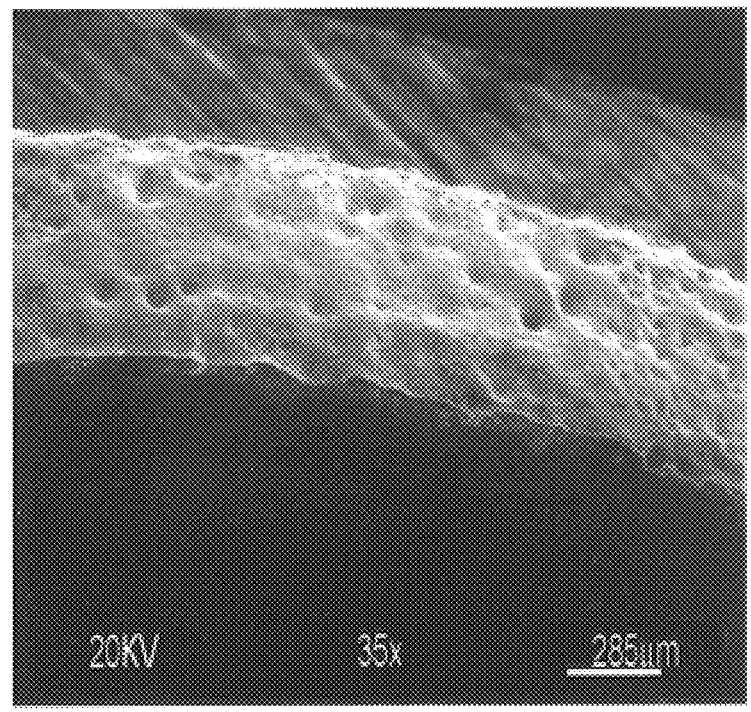
FIG. 4 is a SEM micrograph showing the surface finish of an MMC fabricated in accordance with an alternative embodiment of the present invention.

The effect of current density on surface finish was studied at a rotational speed of 5000 RPM to eliminate interference caused by hydrogen bubbles. The galvanostatic experiments were conducted on SiC$_{40}$/6061 Al MMCs for current densities ranging from 0.4 to 10 A/cm$^2$. Experiments were also conducted on monolithic 6061-T6 Al and ultrapure Al materials. For the SiC$_{40}$/6061 Al MMCs, a dark gray finish was obtained at current densities below approximately 3 A/cm$^2$. The centerline average surface roughness (E) was approximately 4.3 microns at 0.4 A/cm$^2$, and decreased to approximately 1.8 microns at 2.5 A/cm$^2$. A transition to a light gray surface finish occurred above 3 A/cm$^2$. At current densities slightly above 3 A/cm$^2$, the roughness was approximately 2.4 microns and pits began to develop on the surface and increased in number at higher current densities. FIGS. 3 and 4 show SEM micrographs of two SiC$_{40}$/6061 Al metal-matrix composite electrochemically machined at 5000 RPM in aerated 2M NaNO$_3$ electrolyte at 30° C. In FIG. 3, the composite was machined at 2.5 A/cm$^2$, and in FIG. 4 the composite was machined at 10 A/cm$^2$. As illustrated by the surface finish in FIGS. 3 and 4, the preferred current density for machining the SiC$_{40}$/6061 Al MMCs is approximately 2.5 A/cm$^2$ for convection rates corresponding to a rotational speed of 500 RPM. It is likely that higher current densities will also result in smooth surface finishes if the convection rates are increased.

Since the SiC particles were inert, there is a lower limit for the surface roughness which is a fraction of the SiC particle size. A mirror finish was obtained for the monolithic 6061-T6 Al and the ultrapure Al specimens for current densities ranging from 1 To 10 A/cm$^2$. No distinct transitions in surface finish were observed for the 6061-T6 Al or the ultrapure Al over the range of current densities. It can be concluded, therefore, that the SiC particles play a major role in controlling the surface roughness to the extent that the roughness may exceed the SiC particle size.

The surface finish of the SiC$_{40}$/6061 Al MMC was significantly more sensitive to dissolution current density than that of either monolithic 6061-T6 Al or ultrapure Al. The best surface finish for SiC$_{40}$/6061 Al MMC at convection rates corresponding to 5000 RPM were achieved at a current density of approximately 2.5 A/cm$^2$. It is likely that the excellent surface finish can also be achieved at current densities exceeding 2.5 A/cm$^2$ if convection rates are increased. Both 6061-T6 Al and ultrapure Al had mirror finishes for current densities ranging from 1 to 10 A/cm$^2$.

The foregoing description of specific embodiments and examples of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

We claim:

1. A method of machining metal-matrix composite materials comprising the steps of:

providing the metal matrix composite material in an electrochemical machine;

electrochemically machining the metal-matrix composite material comprised of an aluminum matrix reinforced with ceramic materials in a nitrate or chloride containing electrolyte at a current density of equal to or greater than approximately 1 A/cm$^2$; and flushing the electrolyte between the electrochemical tool and metal-matrix composite material.

2. The method of claim 1 wherein the electrolyte is selected from the group consisting of sodium nitrate, potassium nitrate, sodium chloride and potassium chloride.

3. The method of claim 1 wherein the electrolyte has a concentration in excess of 0.1M.

4. The method of claim 1 wherein the electrolyte is sodium nitrate (NaNO$_3$) and has a concentration in excess 0.1M NaNO$_3$.

5. The method of claim 1 wherein the electrolyte is flushed through a gap between the electrochemical tool and the metal-matrix composite material at a sufficient rate to flush away hydrogen bubbles.

6. The method of claim 1 wherein the ceramic particles are discrete particles.

7. The method of claim 1 wherein the aluminum matrix is comprised of an aluminum alloy.

8. The method of claim 1 wherein the ceramic particles have a mean diameter of up to 250 microns.

9. The method of claim 1 wherein the ceramic particles are present in the composite at a concentration exceeding 20 volume %.

10. The method of claim 9 wherein the ceramic particles are comprised of silicon carbide (SiC).

11. The method of claim 1 wherein the current density is in the range of 1 to 10 A/cm$^2$.

12. The method of claim 1 wherein the current density is 2.5 A/cm$^2$.

* * * * *